United States Patent
Kanda et al.

(10) Patent No.: US 10,830,364 B2
(45) Date of Patent: Nov. 10, 2020

(54) OIL CONTROLLED VALVE

(71) Applicant: EATON CORPORATION, Cleveland, OH (US)

(72) Inventors: Robert John Kanda, Lake Orion, MI (US); Todd K. Coulter, Oxford, MI (US); Daniel William Bamber, Farmington Hills, MI (US)

(73) Assignee: Eaton Intelligent Power Limited, Dublin (IE)

( * ) Notice: Subject to any disclaimer, the term of this patent is extended or adjusted under 35 U.S.C. 154(b) by 156 days.

(21) Appl. No.: 15/570,811

(22) PCT Filed: Apr. 28, 2016

(86) PCT No.: PCT/US2016/029787
§ 371 (c)(1),
(2) Date: Oct. 31, 2017

(87) PCT Pub. No.: WO2016/178901
PCT Pub. Date: Nov. 10, 2016

(65) Prior Publication Data
US 2018/0156345 A1 Jun. 7, 2018

Related U.S. Application Data

(60) Provisional application No. 62/157,391, filed on May 5, 2015, provisional application No. 62/167,907, filed
(Continued)

(51) Int. Cl.
F16K 11/07 (2006.01)
F15B 13/04 (2006.01)
(Continued)

(52) U.S. Cl.
CPC .......... F16K 11/22 (2013.01); F15B 13/0431 (2013.01); F16K 11/07 (2013.01);
(Continued)

(58) Field of Classification Search
CPC ...... F16K 11/22; F16K 11/07; F16K 11/0716; F16K 15/183; F16K 31/124;
(Continued)

(56) References Cited

U.S. PATENT DOCUMENTS 6,269,827 B1 * 8/2001 Potter ................. F15B 13/0402
137/14
6,904,937 B2 6/2005 Fischer
(Continued)

FOREIGN PATENT DOCUMENTS

DE 102004026963 A1 12/2005
DE 102007052388 A1 5/2009
(Continued)

OTHER PUBLICATIONS

Extended European Search Report for Application No. 16789787.5 dated Jan. 18, 2019 from European Patent Office, pp. 1-11.
(Continued)

Primary Examiner — Kelsey E Cary
(74) Attorney, Agent, or Firm — Mei & Mark, LLP

(57) ABSTRACT

A valve body comprises an inner compartment extending along a longitudinal axis from a second end portion towards a first end portion. First, second, and third fluid ports in to the valve body are perpendicular to the longitudinal axis. The second fluid port is between the third and the first fluid port. A fourth fluid port is parallel to the longitudinal axis. A spool is configured to selectively reciprocate in the inner compartment. The spool comprises a first fluid receptacle configured to block fluid flow to the third fluid port and to fluidly communicate with the second fluid port when the spool adjoins the first end portion. The first fluid receptacle is configured to fluidly communicate with the second fluid port and with the third fluid port when the spool adjoins the
(Continued)

second end portion. A second fluid receptacle is configured to receive fluid pressure from the fourth fluid port.

26 Claims, 8 Drawing Sheets

Related U.S. Application Data on May 29, 2015, provisional application No. 62/209,494, filed on Aug. 25, 2015.

(51) Int. Cl.
  *F16K 11/22* (2006.01)
  *F15B 13/043* (2006.01)
  *F16K 31/124* (2006.01)
  *F16K 15/18* (2006.01)
  *F15B 13/02* (2006.01)

(52) U.S. Cl.
  CPC ........ *F16K 11/0716* (2013.01); *F16K 15/183* (2013.01); *F16K 31/124* (2013.01); *F15B 13/024* (2013.01); *F15B 2013/041* (2013.01); *F15B 2211/50518* (2013.01); *F15B 2211/5159* (2013.01); *F15B 2211/528* (2013.01); *F15B 2211/55* (2013.01); *F15B 2211/565* (2013.01)

(58) Field of Classification Search
  CPC ............. F16K 11/0708; F15B 13/0431; Y10T 137/86614; Y10T 137/8671; Y10T 137/86582
  USPC ............... 137/625.64, 625.69, 625.6, 596.13
  See application file for complete search history.

(56) References Cited

U.S. PATENT DOCUMENTS

| | | | |
|---|---|---|---|
| 6,959,732 B2 | 11/2005 | Cotton, III et al. | |
| 7,104,283 B2 | 9/2006 | Ino et al. | |
| 8,042,789 B2 | 10/2011 | Dayton et al. | |
| 8,302,570 B2 | 11/2012 | Keller et al. | |
| 8,316,888 B2 | 11/2012 | Beneker et al. | |
| 8,327,750 B2 | 12/2012 | Keller et al. | |
| 8,443,839 B2 | 5/2013 | Beneker et al. | |
| 2004/0112445 A1 | 6/2004 | Fischer | |
| 2004/0163721 A1 | 8/2004 | Cotton, III et al. | |
| 2005/0133098 A1 | 6/2005 | Ino et al. | |
| 2007/0056644 A1 | 3/2007 | Boddy | |
| 2009/0272442 A1 | 11/2009 | Fishwick | |
| 2009/0301588 A1* | 12/2009 | Shimizu | F16H 61/0021 137/625.64 |
| 2010/0089347 A1 | 4/2010 | Keller et al. | |
| 2011/0215269 A1 | 9/2011 | Fischer et al. | |
| 2012/0291727 A1 | 11/2012 | Keller et al. | |
| 2014/0158220 A1* | 6/2014 | Schneider | F16K 11/07 137/315.01 |

FOREIGN PATENT DOCUMENTS

| | | |
|---|---|---|
| EP | 0427981 A1 | 5/1991 |
| EP | 1705411 A1 | 9/2006 |
| GB | 1526630 A | 9/1978 |
| JP | S56173202 U | 12/1981 |
| JP | H10141315 A | 5/1998 |
| WO | WO2012-021101 A1 | 2/2012 |
| WO | 2013130316 A1 | 9/2013 |

OTHER PUBLICATIONS

International Search Report for PCT/US2016/029787 dated Aug. 4, 2016, pp. 1-3.
Written Opinion of the International Searching Authority for PCT/US2016/029787 dated Aug. 4, 2016, pp. 1-6.

* cited by examiner

OIL CONTROLLED VALVE

This is a § 371 National Stage entry of Application No. PCT/US2016/029787, filed Apr. 28, 2016, and claims the benefit of U.S. provisional application 62/157,391 filed May 5, 2015, U.S. provisional application 62/167,907, filed May 29, 2015, and U.S. provisional application 62/209,494 filed Aug. 25, 2015, all of which are incorporated herein by reference.

FIELD

This application relates to an oil controlled valve.

BACKGROUND

Hydraulic valves have difficulty responding quickly between the on and off position during applications requiring a high rate of flow. Even if the valve can respond quickly, the flow paths containing fluid can slow the operation down if the paths contain air pockets or inadequate pressure. As such it is difficult to keep the flow paths primed before the valve switches between the off and on position. This presents an even greater challenge during operations that require both a high rate of flow and a frequent change of flow, for example, switching between an off and on position, or in the case of a three-way valve, switching between different flow paths.

SUMMARY

The methods and devices disclosed herein overcome the above disadvantages and improves the art by way of a valve arrangement that keeps flow paths primed and ready for sudden switching between an off and on position while accommodating a high rate of flow.

A valve assembly comprises a valve body extending along a longitudinal axis. The valve body comprises a first end portion and a second end portion, and an inner compartment extending through the valve body from the second end portion towards the first end portion. A first fluid port in to the valve body is perpendicular to the longitudinal axis. A second fluid port in to the inner compartment is spaced from the first fluid port, and the second fluid port is perpendicular to the longitudinal axis. A third fluid port in to the inner compartment is spaced from the second fluid port, and the third fluid port is perpendicular to the longitudinal axis, and the second fluid port is between the third fluid port and the first fluid port. A fourth fluid port is parallel to the longitudinal axis, and the fourth fluid port fluidly connects the second end portion to the inner compartment. A spool is in the inner compartment, and the spool is configured to selectively reciprocate in the inner compartment between a first position adjoining the first end portion to a second position adjoining the second end portion. The spool comprises a first fluid receptacle configured to block fluid flow to the third fluid port and to fluidly communicate with the second fluid port when the spool adjoins the first end portion. The first fluid receptacle is configured to fluidly communicate with the second fluid port and with the third fluid port when the spool adjoins the second end portion. A second fluid receptacle is configured to receive fluid pressure from the fourth fluid port and is configured to fluidly seal the fourth fluid port from the first fluid port.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

DETAILED DESCRIPTION

Figure 1A:
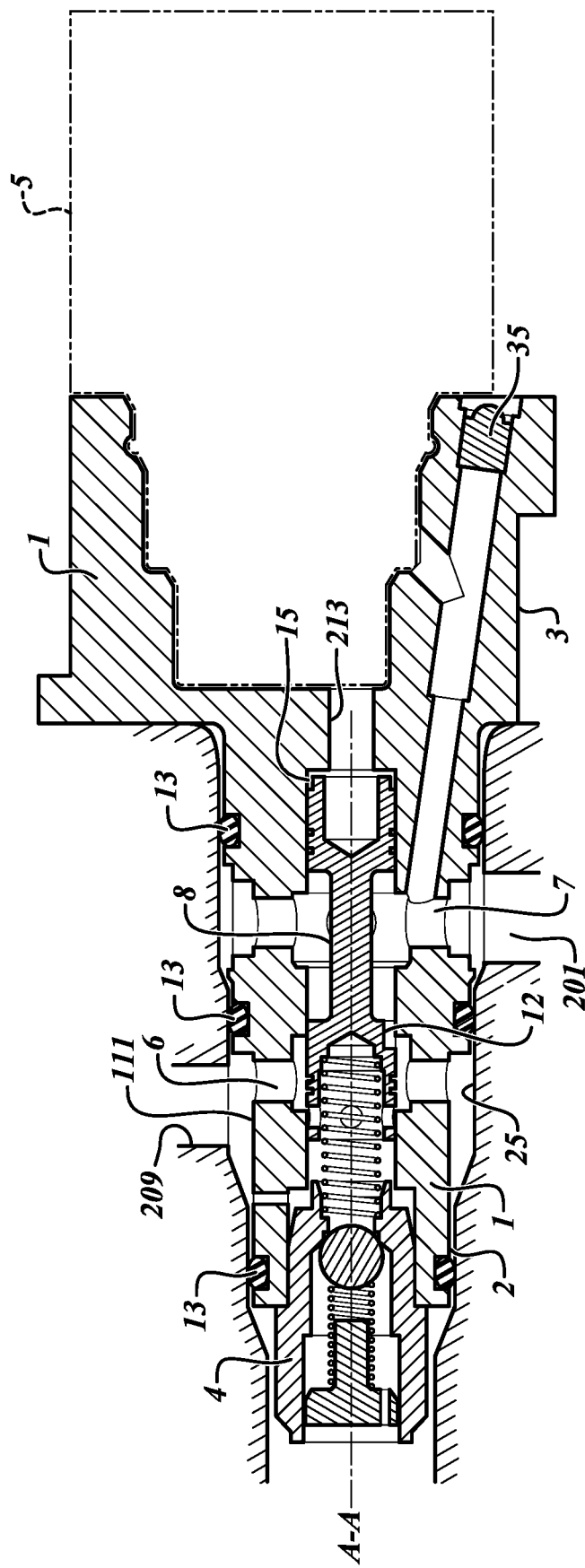
FIG. 1A is a cross-section view of a valve arrangement.

Reference will now be made to the examples which are illustrated in the drawings. Wherever possible, the same reference numbers will be used throughout the drawings to refer to the same or like parts. Directional references such as "left" and "right" are for ease of reference to the figures, and are not to limit the installation direction of the assembled valve arrangement.

FIG. 1A is a cross-section view of a valve arrangement. The valve arrangement includes a valve body 1. The valve body extends along a longitudinal axis A-A. A first fluid port 7 in to the valve body is perpendicular to the longitudinal axis. A second fluid port 6, or control port, in to the inner compartment is spaced from the first fluid port, and the second fluid port 6 is perpendicular to the longitudinal axis. A third fluid port 11 in to the inner compartment 14 is spaced from the second fluid port 6, and the third fluid port 11 is perpendicular to the longitudinal axis A-A. The second fluid port 6 is between the third fluid port 11 and the first fluid port 7. A fourth fluid port 213 is parallel to the longitudinal axis A-A, and the fourth fluid port 213 fluidly connects the second end portion 2 to the inner compartment 14.

The valve body 1 and has a first end portion 2 and a second end portion 3. The arrangement includes a regulation valve 4 located at the first end portion 2 and solenoid valve 5 located at the second end portion 3. Supply fluid under pressure can flow from a first fluid port 7 to the solenoid valve 5 via conduit 16. When the solenoid valve is energized, supply fluid flows from the first fluid port 7 to the solenoid valve 5 to a second end 10 of a spool 8. The fluid moves the spool 8 toward the regulation valve 4, thus, allowing the first fluid port 7 to fluidly communicate with the second fluid port 6. Fluid flowing from the second fluid port 6 can flow to a control component 80, for example, an engine brake or other device that can receive fluid under pressure. When the solenoid valve 5 is energized, the first end 9 of the spool 8 abuts the regulation valve 4.

While in the energized, or on position, fluid cannot flow from the second fluid port 6 to the third fluid port 11 via the inner compartment 14. However, fluid moves outside the valve 1, along the housing 25. O-rings 13 can seal fluid pathways between the valve body 1 and housing 25, creating a pathway between the second fluid port 6 and the third fluid port 11. When control pressure is alleviated, the fluid pathway between the valve outer body 111 and housing 25 allows the fluid to flow to the first end 9 of the spool. This allows fluid to create pressure against the first end 9 of the spool. A predetermined pressure can be maintained by the regulation valve 4. This can benefit the arrangement in several ways, for example, it keeps the system primed and ready to transition from the first, or off, position to the second, or on, position, when the solenoid valve 5 is not energized. The pathway between the second fluid port 6 and the third fluid port 11 also prevents hydraulic lock from occurring during the transition from the on to the off position. It further assists in moving the spool 8 toward the solenoid valve 5 along the axis A-A during the transition from the on position to the off position.

When in the off position, the solenoid valve 5 is not energized and the second end 10 of the spool is positioned against a portion of the valve body 1 closer to the solenoid valve 5 toward the second end portion 3 of the valve body 1. The solenoid valve 5 can be a three-way valve, allowing fluid to flow to the spool 8 when on or to an exhaust or fluid reservoir when off. A metered leakage path, in the form of an undercut 12 on the spool, forms opening 19, which permits leakage from first fluid port 7 towards second fluid port 6. In the off position, fluid can also flow from first fluid port 7 at the first end of the spool through opening 19. When a pass-through 30 in the spool communicates with second fluid port 6, excess fluid pressure can be relieved via pressure relief path 211 to a tank 50 attached to the regulation valve 4, as by overcoming the spring force of spring 42 against the check ball 41. Regulation valve 4 can be a check valve. The spring is biased against a plug 43 that can be have vents 47 or tessellations for exhausting fluid to the tank 50. The arrangement in the off position keeps the valve primed and ready for a transition from the off position to the on position.

Figure 1B:
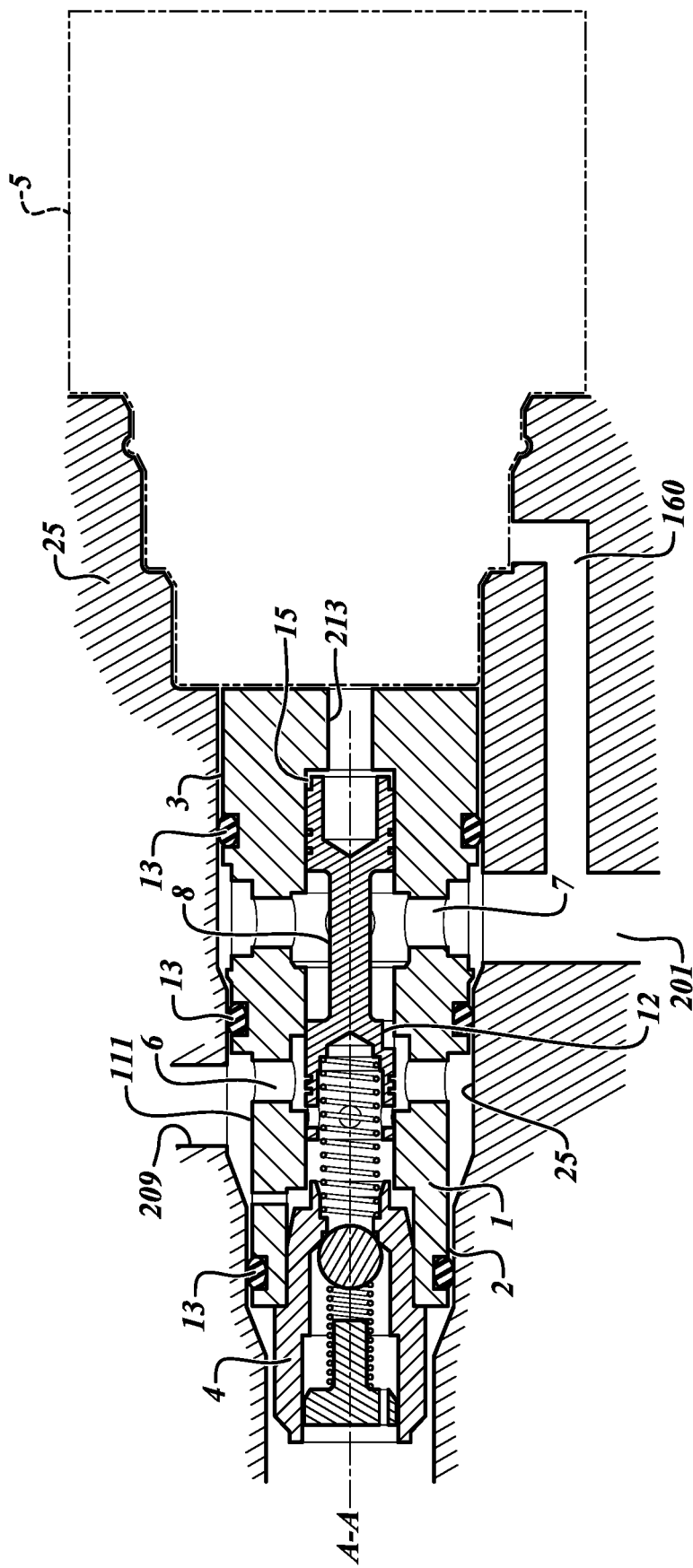
FIG. 1B is a cross-section view of an alternative valve arrangement.

When a high pressure is desired to the control component attached to control port 6, the solenoid is powered on. The first fluid port 7 at system (high) pressure fluid, which is passed to conduit 16. The conduit 16 can be drilled in to the valve body 1 and plugged by plug 35, as illustrated in FIG. 1A. Or, the conduit 160 can be drilled in to the housing 25 as illustrated in FIG. 1B. Other manufacturing techniques, such as casting and molding can be used alone or together with the drilling to form the housing 25 and its affiliated paths and conduits. The high pressure fluid passes through a three way valve or solenoid and to the spool 8. The spool moves towards the first end portion 2. A lip 20 on the spool moves to abut rim 45 of the regulation valve 4 to block the release of pressure through the check valve. This permits the increased control pressure to pass to second fluid port 6 without leaking out of regulation valve 4. The pass-through 30 is also blocked by the valve body 1.

Figure 3A:
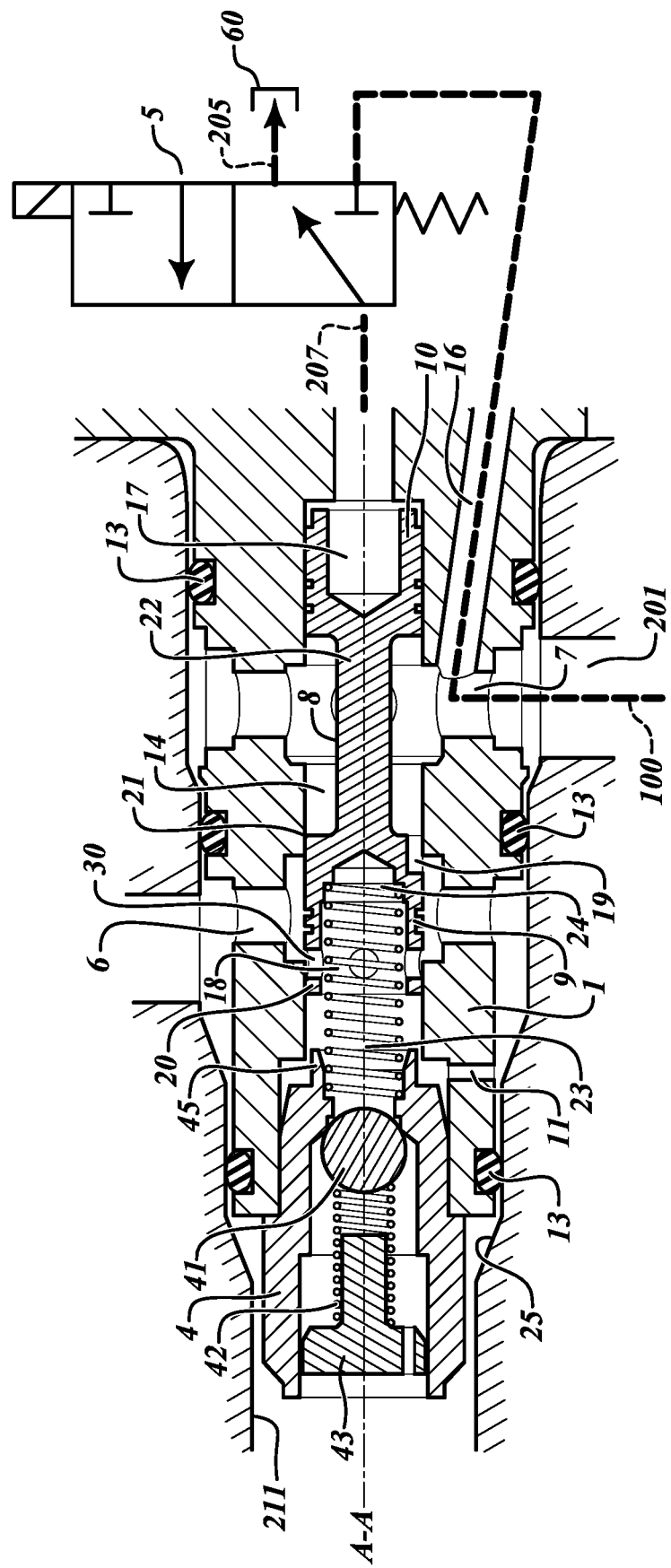
FIGS. 3A-3E are cross-section views of a valve arrangement comprising fluid flow paths.

FIGS. 3A-3E are additional cross-section views of a valve arrangement. The arrangements include an internal compartment 14 where the spool 8 is located. The spool 8 has an arm 22 that connects the first end 9 of the spool to the second end 10 of the spool. The first end 9 of the spool 8 includes a first fluid receptacle 18. The first fluid receptacle 18 can be configured adjoining the inner compartment 14 to block fluid flow between the first fluid receptacle 18 and the third fluid port 6 when the spool adjoins the first end portion 2. The second end 10 of the spool 8 includes a second fluid receptacle 17. Fluid can flow to the internal compartment 14 along first fluid pathway 100 through first fluid port 7. The second fluid receptacle 17 can be configured to receive fluid pressure from the fourth fluid port 213 via the first fluid pathway 207 and can be further configured adjoining the inner compartment 14 to fluidly seal the fourth fluid port 213 and the first fluid pathway 207 from the first fluid port 7. Fluid can flow to the solenoid valve 5 (illustrated by symbols as a three-way valve) along conduit 16. The solenoid can block fluid flow to second fluid receptacle 17, or pass fluid to a sump or exhaust 60, or pass fluid to second fluid receptacle 17 to prime it for motion. FIG. 3A illustrates that fluid can enter internal compartment 14. Maintaining the fluid at a preset pressure can prime the control component attached to port 6 and alternatively or additionally prime the spool 8 for motion.

Figure 3B:
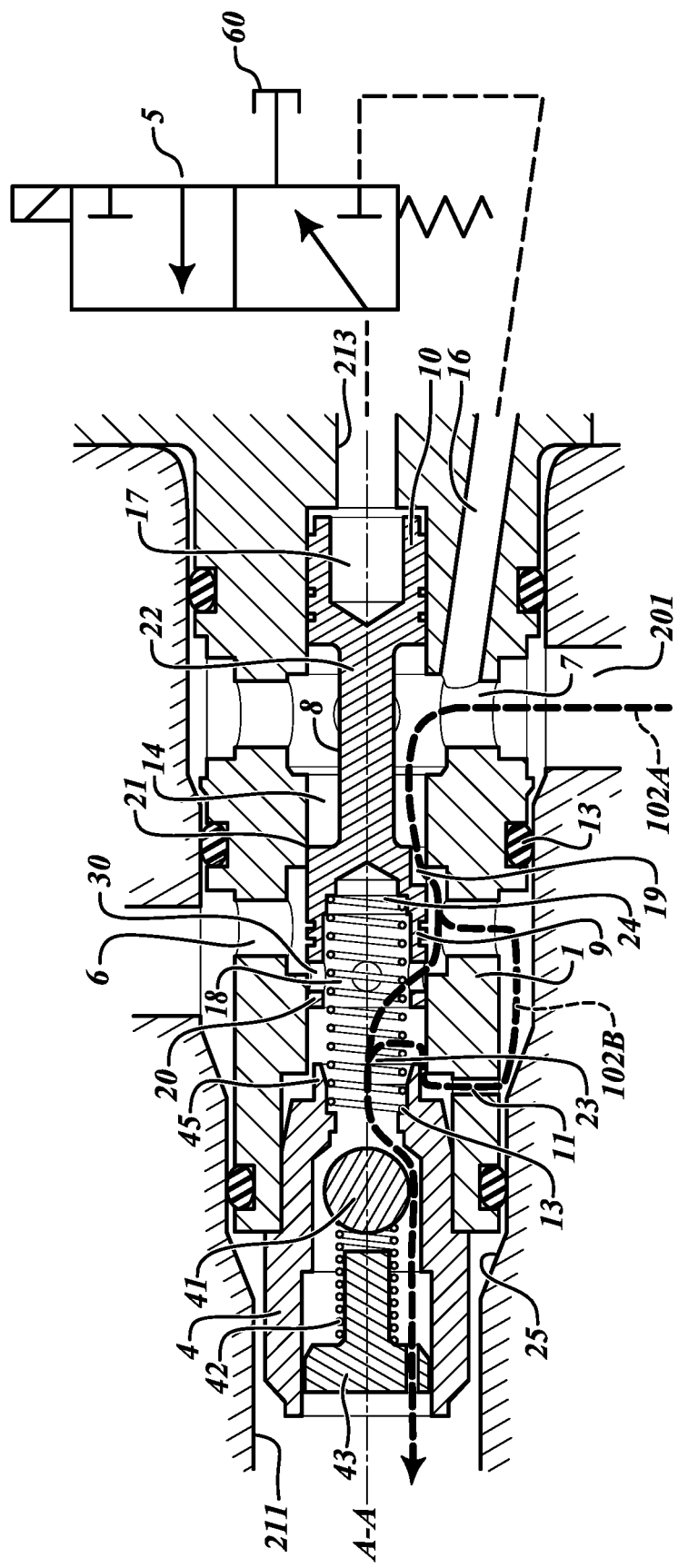
Figure 3C:
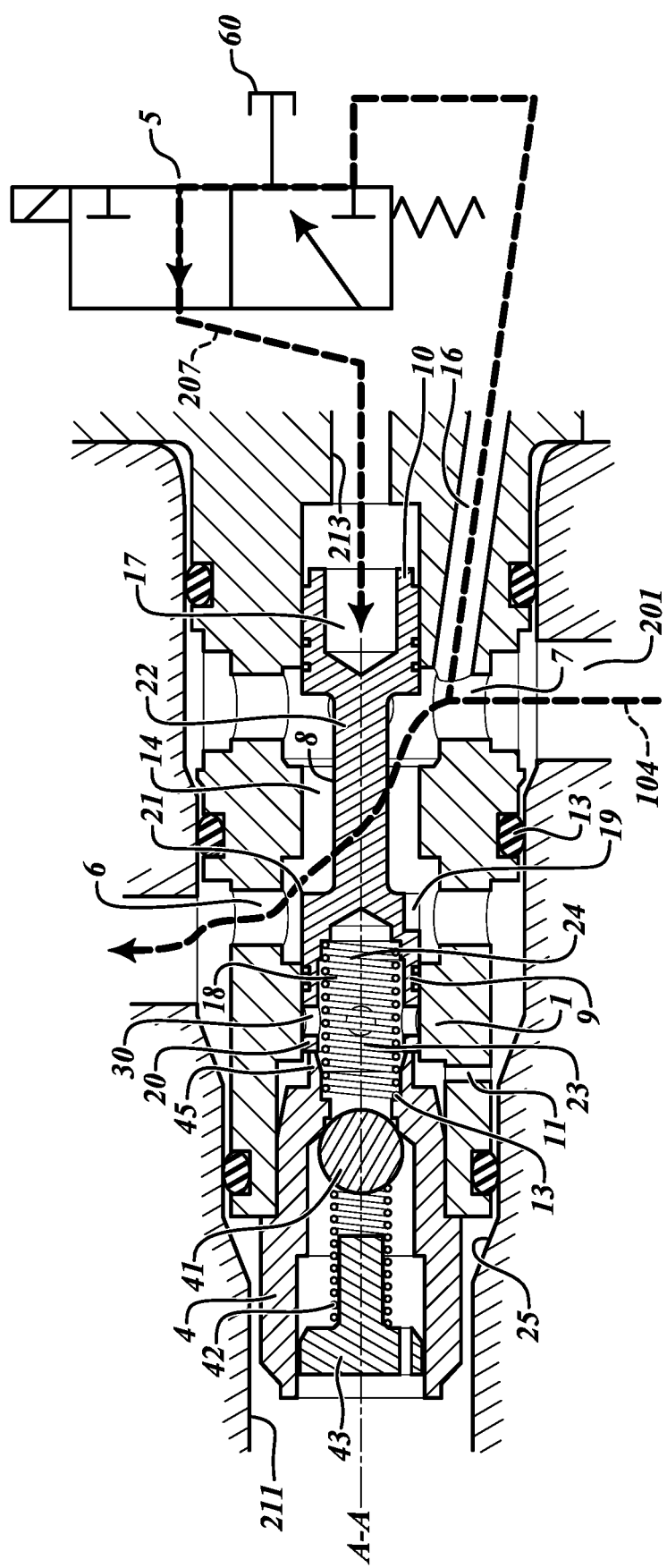

When in the on or energized position, shown in FIG. 3C, the solenoid valve 5 allows fluid to flow along path 207 to the fourth fluid port and the second fluid receptacle 17, moving the spool 8 toward the regulation valve 4. A different pressure than the system or preset pressure, such as a higher control pressure, can be supplied to the control port 6 to actuate the control component along flow path 104. The high pressure also overcomes the spring force of spring 23 to move the spool 8. The spring 23 fits in an inner recess 24 in the first fluid receptacle 18.

When in the off position, as shown in FIG. 3B, the undercut 12 allows fluid to flow in the opening 19 from the first fluid port 7 to the second fluid port 6 along relief path 102A. Fluid can be bled off at the regulation valve 4. Because the lip 20 is away from the regulation valve 4, fluid can pass between valve outer body 111 and housing 25 along second relief path 102B.

But when in the fully on position, relief paths 102A & 102B are closed because pass-through 30 is blocked by the valve body 1. And, lip 20 abuts regulation valve rim 45, which blocks the flow path through third fluid port 11.

When control component fluid pressure control is complete, the fluid pressure supplied to the valve 1 can return from a higher control pressure to a lower system or preset pressure. With high enough preset pressure at first fluid port 7, fluid will not drain back through first fluid port 7, and the valve will be primed for fast return to the on position. Thus, it is beneficial to maintain a higher pressure at first port 7 than at control port 6. The metered leakage at opening 19 and metered flow through pass-through 30 help accomplish the requisite pressure difference between first port 7 and second port 6.

Figure 3D:
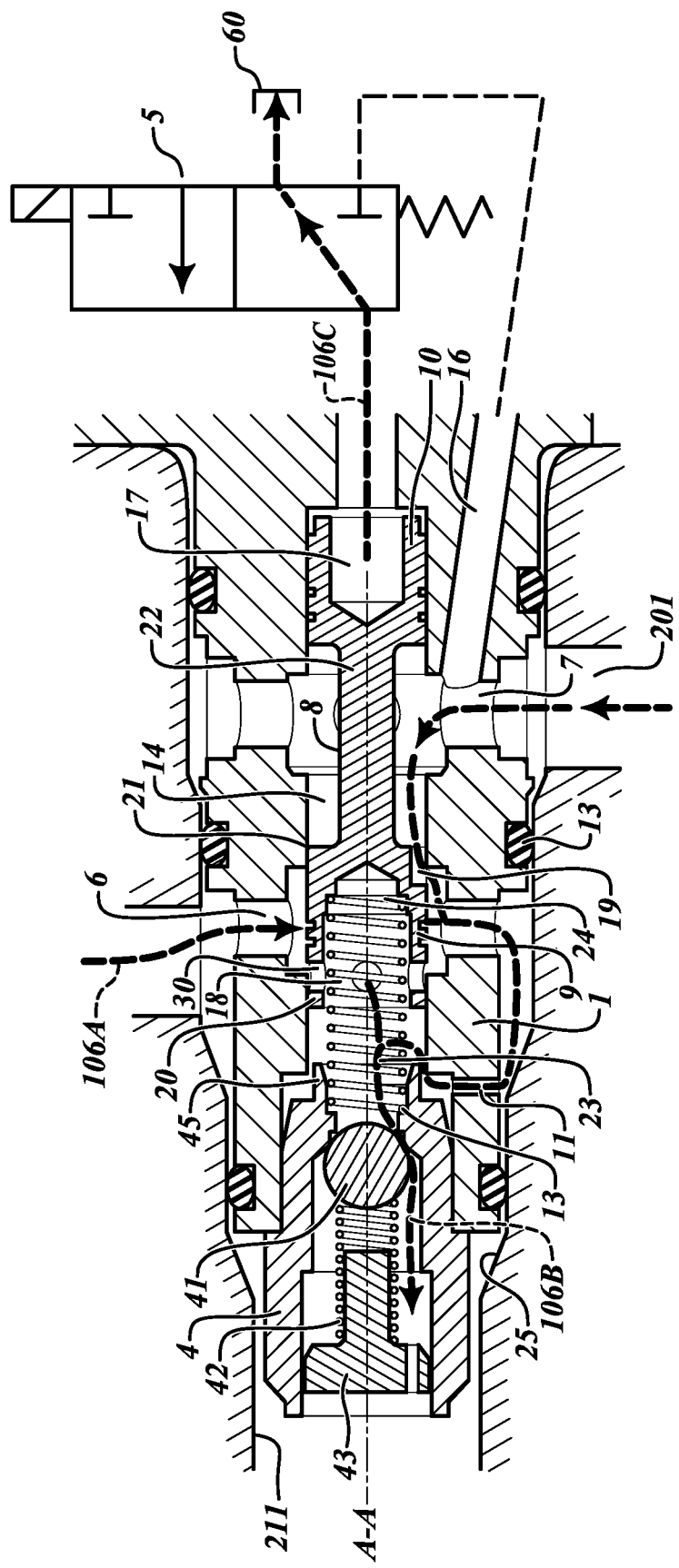
Figure 3E:
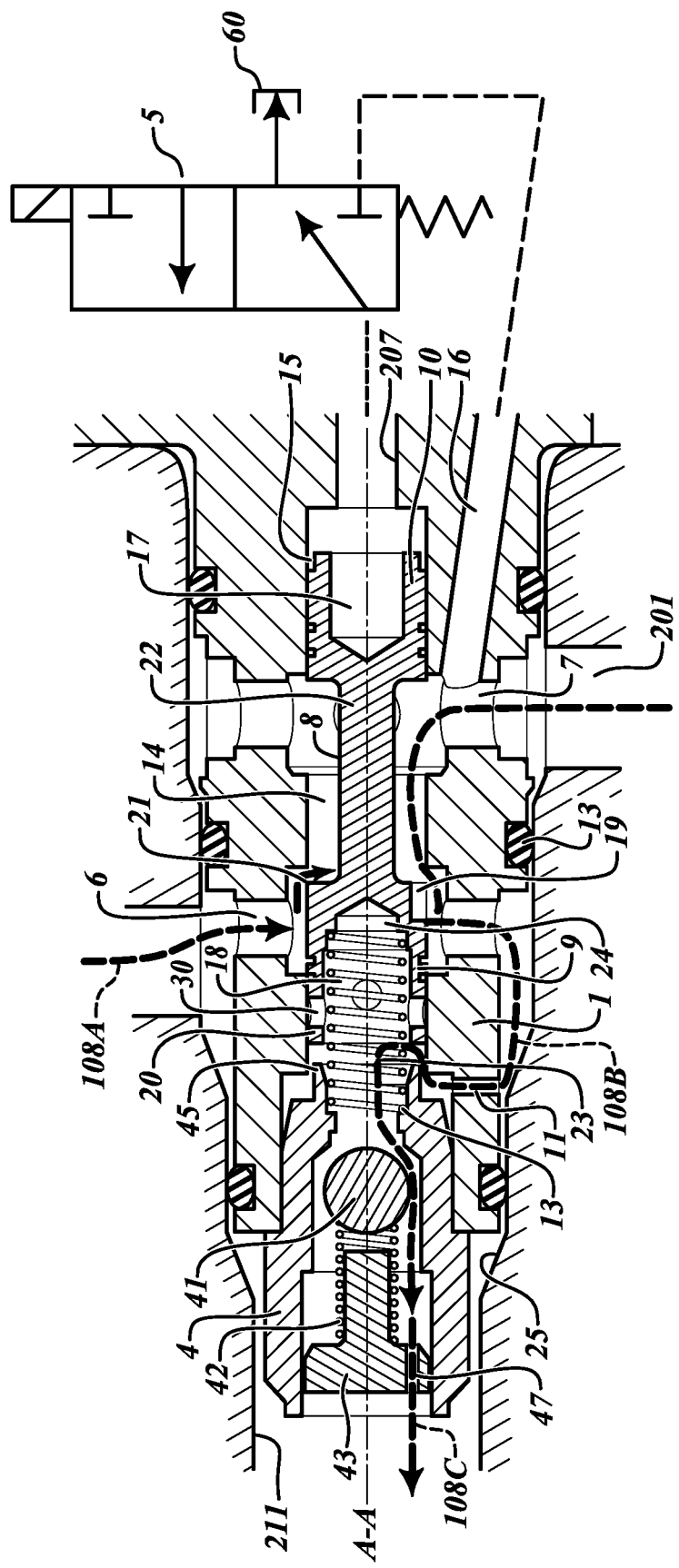

To relieve control pressure, FIG. 3D shows a return path 106A. The relieved control pressure can exhaust out regulation valve 4 following at least second return path 106B, or by joining system pressure fluid from path 201 within second fluid receptacle 18. The preset or system pressure supplied to first fluid port 7 can be relieved through regulation valve 4, as needed. Fluid from first fluid receptacle 17 can be routed by 3-way valve 5 to a sump or exhaust 60 via third return path 106C.

When returning to the off position, the spool begins in the on position but transitions to the off position along an intermediate pathway. Shown in FIG. 3E, control fluid can flow along intermediate return path 108A from the second fluid port 6 to the third fluid port 11 between the housing 25 and the valve body 1 with the flow path sealed by o-rings 13. When the spool 8 moves to an intermediate position, lock-relief path 108B opens. This can create a pressure against the first end 9 of the spool 8 because fluid fills the first fluid receptacle 18. This pressure can assist the spring 23 in moving the spool 8 toward the solenoid valve 5 when the solenoid valve is de-energized. The lock-relief path 108B alleviates hydraulic lock, or a suction-based force retaining first fluid receptacle against the regulation valve 4. The control fluid can also move check ball 41 and exit regulation valve along intermediate relief path 108C. Thus, the first fluid receptacle 18 is positioned with respect to the third fluid port 11 and the second fluid port 6 such that, at a first intermediate spool position, fluid flow in to the first fluid receptacle 18 is only through the third fluid port 11. But as the spool slides to the off position, a second intermediate position permits fluid flow in to the first fluid receptacle 18 through both the third fluid port 11 and the second fluid port 6; this flow path remains through the spool reaching the off position.

Once spool 8 moves from the intermediate position to the off position, the alternative flow paths of FIG. 3A become available at the three way valve or solenoid, as designed. The relief paths 102A-102C of FIG. 3B also return. The metered leakage path or opening 19, pass-through 30, and regulation valve 4 are accessible to fluid pressure. Preset, or system pressure, fluid flow between the first fluid port 7 to the second fluid port 6 keeps the arrangement primed and ready to transition from the off to the on position.

The valve arrangement can be inserted into a bore in housing 25 using o-rings 13 to seal the fluid. The valve arrangement can be held in place by a retaining mechanism such as a retaining bolt or dowel pin. O-rings 13 can be used to separate fluids, for example, supply fluid, control fluid, and exhaust fluid. The fluids can be the same type of fluid (e.g. oil) but under different pressures in the various compartments and ports (e.g. supply port, control port, or exhaust port).

The valve arrangement works well in devices requiring a high flow rate (thus high pressure) and a quick transition between the off and on position. The arrangement can normally remain in the off position until energized. When in the off position, fluid in second fluid receptacle 17 can flow out of the solenoid valve 5 to a sump or exhaust 60. As a three-way valve, the solenoid valve 5 can direct flow to the spool 8 when energized and to the exhaust 60 when de-energized.

When in the off position, there can be regulation pressure due to the check ball arrangement on the first end 9 of the spool 8. In this position, the stepped edge 21 on the exterior of the first receptacle of the spool can be higher on a first side of the spool to overlap the control port 6 so that the majority of the flow area is shut off. But on a second side of the exterior of the first receptacle of the spool, undercut 12 is made so that a small opening 19, or metered leakage path, exists between the valve body 1 and the spool. The opening 19 allows a small amount of flow into the control port. This flow can pass through the undercut 12 in the spool and through a drilled port (the pass-through 30) in the spool to reach the chamber at the end of the spool. A calibrated regulation valve 4 (e.g. check valve or ball valve) can sit on the end of the valve body 1 and maintain a preset level of pressure in the chamber at the end of the spool. This pressure keeps fluid (e.g. oil) moving through the system to prevent aeration and to keep the downstream system primed for fast response. The exiting fluid can be sent to tank 50. Should the assembly experience a pressure in excess of the preset level of pressure, the check mechanism, such as ball 41, moves against spring 42 to vent the excess. But when the lip 20 of the first receptacle abuts the rim 45, flow through regulation valve 4 is blocked, and a control pressure different from the preset pressure can pass through the valve body from first fluid port 7 to the (control) second fluid port 6.

Figure 2:
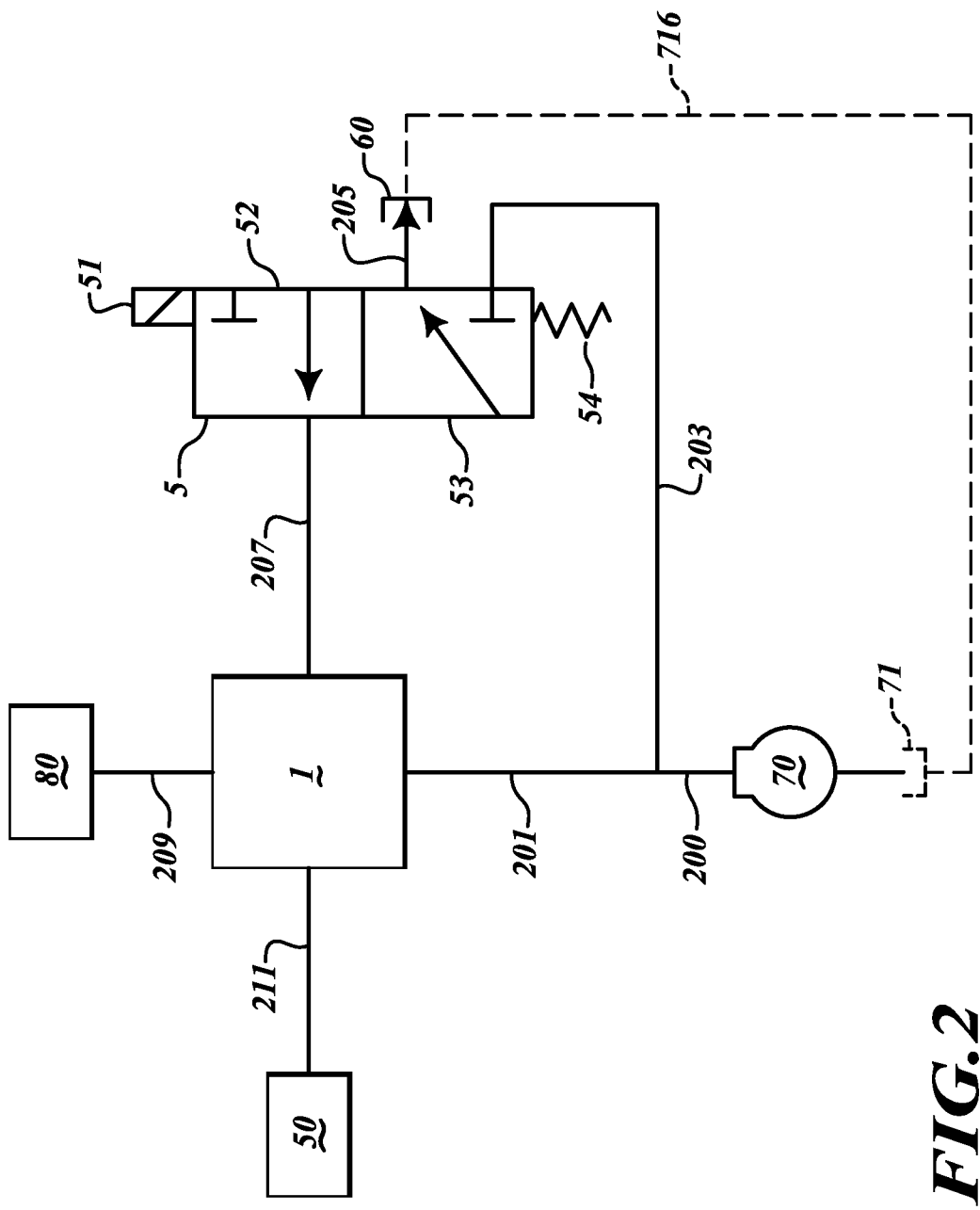
FIG. 2 is a schematic fluid flow arrangement.

FIG. 2 illustrates schematically the fluid flow paths possible as the spool 8 in the valve body 1 selectively reciprocates in the inner compartment 14 between a first position (on position) adjoining the first end portion 2 to a second position (off position) adjoining the second end portion 3. A pump 70 draws fluid from a sump 71 to control fluid pressure. The sump 71 is optionally joined to exhaust path 205 or exhaust 60 via sump path 716. Pumped fluid travels path 200, where it can enter first fluid port 7 via path 201, or be directed via path 203 to solenoid 5. Path 203 can be within housing 25, or drilled in to valve body 1 as conduit 16. Solenoid 5 comprises upper schematic half 52 indicating powered fluid flow via power and control source 51, and lower schematic half 53 indicating unpowered fluid flow with passive mechanism 54.

When the solenoid is powered to pass fluid, fluid travels to fourth fluid port 213 via path 207 in to valve body 1 to move spool 8. Fluid can travel between first port 7 to control path 209 attached to control port 6 and from there to control device 80. As above, an pressure relief path 211 permits excess pressure relief to tank 50 when the solenoid is off.

When the valve arrangement is in the on position, hydraulic force created from the pressurized fluid flowing from the solenoid valve 5 can overcome the spring 23 bias on the spool 8 and move the spool toward the regulation valve 4 along axis A. The spool can comprise one or more diameter changes 15 in the second end 10. As the spool bangs against the inner compartment wall when returning to the off position, the diameter change on the spool prevents burrs or marring from interfering with spool action. The spool end can further comprise notches in the circumference to allow the fluid pressure to act across the full spool diameter. In the on position, the control port is open to the supply pressure so the high-pressure fluid can flow to the control component (e.g. engine brake). Flow between the regulation valve 4 and the first end 9 of the spool can be shut off. However, when the spool moves, another port (e.g. third port 11) drilled through the valve body 1 can allow flow between the regulation valve 4 and the first end 9 portion of the spool. This third port 11 allows fluid to travel into first fluid receptacle 18 while the spool 8 moves back to the off position. This bleed back of fluid in to first fluid receptacle 18 prevents hydraulic lock and aids the spring 23 in moving the spool 8, thus, increasing the response time of the valve arrangement. The bleed back fluid, when high pressure control fluid, can provide pressure to the third port 11 to assist spool movement to the off position.

By implementing a fluid control strategy, the valve 1 is fluidly controlled. Electrical assist is necessary to power the solenoid 5 and can be necessary to power the alternative three way valve. By controlling the pressure supplied to the first through fourth fluid ports, the spool is selectively reciprocated within the inner compartment and a first fluid pathway to the second end of the spool can be supplied or relieved, a second fluid pathway through the regulation valve can permit bleed off of fluid pressure or be blocked, and the third fluid port can be connected fluidly to the first fluid port or blocked. Appropriate computer control, such as tangible memory device, processor executable instructions stored in the memory device, and processor can implement methods of operating the valve in accordance with the disclosed structures and paths.

Other implementations will be apparent to those skilled in the art from consideration of the specification and practice of the examples disclosed herein.

What is claimed is:

1. A valve arrangement comprising:
   a valve body, the valve body comprising an axis, a first end portion, and a second end portion;
   a regulation valve located at the first end portion of the valve body;
   a solenoid valve located at the second end portion of the valve body;
   a first fluid port in the valve body;
   a second fluid port in the valve body;
   a third fluid port located in the valve body;

a spool located inside the valve body between the regulation valve and the solenoid valve; and an undercut in an exterior surface of the spool forming an opening between the spool and the valve body, wherein the spool is configured to move axially along the axis of the valve body;

wherein the spool comprises a first end and a second end;

wherein the spool is configured to move between a first position adjoining the regulation valve and a second position adjoining the solenoid valve;

wherein the first end of the spool is located between the regulation valve and the solenoid valve along the axis;

wherein the second end of the spool is located between the first end of the spool and the solenoid valve along the axis;

wherein the third fluid port is in fluid communication with the first fluid port through the second fluid port when the spool is in the first position;

wherein the spool is configured so that fluid flows from the second fluid port to the first end of the spool through the third fluid port when the spool moves from the first position to the second position;

wherein the first fluid port is in fluid communication with the second fluid port when the spool is in the first position;

wherein the first fluid port is configured to fluidly communicate with the solenoid valve;

wherein the opening is configured so that fluid flows from the first fluid port to the first end portion of the spool through the opening when the spool is in the second position; and wherein the opening is configured so that fluid flow through the opening to the first end portion is blocked when the spool is in the first position.

2. The valve arrangement of claim 1, wherein the second fluid port is in fluid communication with an engine brake.

3. The valve arrangement of claim 1, wherein the regulation valve is a check valve.

4. The valve arrangement of claim 1, wherein the regulation valve is a ball valve.

5. The valve arrangement of claim 1, comprising a first o-ring and a second o-ring, and further configured so that fluid flows from the second fluid port to the third fluid port in between the first o-ring and the second o-ring.

6. The valve arrangement of claim 1, further configured so that fluid exits the solenoid valve when the spool is in the second position.

7. The valve arrangement of claim 1, further configured so that fluid exits the regulation valve when the spool is in the second position.

8. The valve arrangement of claim 1, wherein the spool is configured so that fluid flowing through the third fluid port prevents hydraulic lock as the spool moves from the first position to the second position.

9. The valve arrangement of claim 1, wherein the spool is configured with a pass-through so that fluid flows through the third fluid port to move the spool toward the solenoid valve as the spool moves from the first position to the second position.

10. The valve arrangement of claim 1, wherein the regulation valve is configured to maintain a pressure less than the pressure of the fluid flowing through the second fluid port.

11. The valve arrangement of claim 1, further comprising:
a housing; and
a fluid pathway between the housing and the valve body, wherein, when the spool is in the second position, the second fluid port fluidly communicates with the third fluid port through the fluid pathway between the valve body and the housing; and wherein, when the spool is in the second position, fluid flows from the second fluid port to the first end of the spool through the third fluid port.

12. A valve comprising:
an axially extending valve body comprising:
a first end portion and a second end portion;
an inner compartment extending through the valve body from the second end portion towards the first end portion;
a first fluid port into the valve body;
a first fluid pathway connecting the second end portion to the inner compartment;
a second fluid port into the inner compartment, the second fluid port spaced from the first fluid port;
a third fluid port in the inner compartment, the third fluid port spaced from the second fluid port, and the second fluid port is between the third fluid port and the first fluid port; and
a second fluid pathway connecting the first end portion to the inner compartment;
a spool in the inner compartment, the spool configured to selectively reciprocate in the inner compartment between a position adjoining the first end portion to a position adjoining the second end portion, the spool comprising:
a first fluid receptacle connected to a second fluid receptacle, the first fluid receptacle comprising:
a pass-through configured to fluidly communicate with the second fluid port when the spool adjoins the second end portion, and to be blocked by the valve body when the spool adjoins the first end portion; and
a lip spaced from the pass-through, the lip configured to selectively block the third fluid port when the spool adjoins the first end portion; and
the second fluid receptacle configured to receive fluid pressure from the first fluid pathway.

13. The valve of claim 12, further comprising a regulation valve in the first end portion, wherein the lip selectively abuts the regulation valve to block fluid flow to the third fluid port.

14. The valve of claim 13 wherein the first fluid receptacle comprises an outer undercut, and when the spool is adjacent the second end portion, the undercut fluidly connects the first port to the regulation valve through the pass-through.

15. The valve of claim 13, further comprising a spring, wherein the first receptacle comprises an inner recess, and wherein the spring is biased between the inner recess and the regulation valve.

16. The valve of claim 12, further comprising a solenoid valve configured to selectively fluidly connect the first fluid pathway to the first fluid port.

17. The valve of claim 12, wherein the first fluid receptacle is connected to the second fluid receptacle by an arm.

18. The valve of claim 12, wherein the first receptacle comprises an outer undercut, and when the spool is adjacent the second end portion, the undercut fluidly connects the third port to the first port through the second port.

19. A valve assembly comprising:
a valve body extending along a longitudinal axis, the valve body comprising:
  a first end portion and a second end portion;
  an inner compartment extending through the valve body from the second end portion towards the first end portion;
  a first fluid port into the valve body, the first fluid port perpendicular to the longitudinal axis;
  a second fluid port into the inner compartment, the second fluid port spaced from the first fluid port, the second fluid port perpendicular to the longitudinal axis;
  a third fluid port into the inner compartment, the third fluid port spaced from the second fluid port, the third fluid port perpendicular to the longitudinal axis, and the second fluid port is between the third fluid port and the first fluid port; and
  a fourth fluid port parallel to the longitudinal axis, the fourth fluid port fluidly connecting the second end portion to the inner compartment; and
a spool in the inner compartment, the spool configured to selectively reciprocate in the inner compartment between a first position adjoining the first end portion to a second position adjoining the second end portion, the spool comprising:
  a first fluid receptacle, the first fluid receptacle configured adjoining the inner compartment to block fluid flow between the first fluid receptacle and the third fluid port when the spool adjoins the first end portion, and the first fluid receptacle is configured to fluidly communicate with the second fluid port and with the third fluid port when the spool adjoins the second end portion; and
  a second fluid receptacle configured to receive fluid pressure from the fourth fluid port and further configured adjoining the inner compartment to fluidly seal the fourth fluid port from the first fluid port,
wherein the first fluid receptacle is positioned with respect to the third fluid port and the second fluid port such that, at a first intermediate position, fluid flow in to the first fluid receptacle is only through the third fluid port, but at a second intermediate position and at the second position, fluid flow in to the first fluid receptacle is through both the third fluid port and the second fluid port.

20. The valve assembly of claim 19, wherein the first fluid receptacle further comprises:
a pass-through configured to selectively fluidly communicate with the second fluid port; and
a lip spaced from the pass-through, the lip configured to selectively block the third fluid port when the lip abuts a rim in the first end portion.

21. The valve assembly of claim 19, further comprising a regulation valve in the first end portion, and the regulation valve comprises a rim, wherein the third fluid port adjoins the regulation valve, and wherein the first fluid receptacle comprises a lip that abuts the rim to block fluid flow through the third fluid port when the spool adjoins the first end.

22. The valve assembly of claim 19, wherein the first fluid receptacle further comprises an exterior stepped edge comprising an undercut, and the undercut and the inner compartment selectively form a metered leakage path between the first fluid port and the second fluid port.

23. The valve assembly of claim 19, wherein the second fluid receptacle further comprises exterior notches facing the fourth fluid port.

24. The valve assembly of claim 19, wherein the second fluid receptacle further comprises an exterior diameter change facing the fourth fluid port.

25. A valve arrangement comprising:
a valve body, the valve body comprising an axis, a first end portion, and a second end portion;
a housing surrounding the valve body;
a regulation valve located at the first end portion of the valve body;
a solenoid valve located at the second end portion of the valve body;
a first fluid port in the valve body;
a second fluid port in the valve body;
a third fluid port located in the valve body;
a spool located inside the valve body between the regulation valve and the solenoid valve; and
an undercut in an exterior surface of the spool forming an opening between the spool and the valve body,
wherein the spool moves axially along the axis of the valve body;
wherein the spool comprises a first end and a second end;
wherein the spool moves among a first position with the first end adjoining the regulation valve, a second position with the second end adjoining the solenoid valve, and an intermediate position between the first position and the second position;
wherein, when the spool is in the intermediate position, the third fluid port is in fluid communication with the second fluid port along a lock relief path between the housing and the valve body;
wherein, when the spool is in the second position, the first end of the spool and the regulation valve are in fluid communication with the first fluid port through the second fluid port and through the third fluid port;
wherein, when the spool moves from the second position to the first position, fluid flows from the second fluid port to the first end of the spool through the third fluid port;
wherein, when the spool is in the second position, the first fluid port is in fluid communication with the second fluid port;
wherein the first fluid port is in fluid communication with the solenoid valve; and
wherein the spool is configured so that fluid flows from the first fluid port to the first end portion of the spool through the opening when the spool is in the second position.

26. A valve assembly comprising:
a housing;
a valve body, the valve body comprising an axis, a first end portion, and a second end portion;
a regulation valve located at the first end portion of the valve body;
a solenoid valve located at the second end portion of the valve body;
a first fluid port into the valve body;
a second fluid port into the valve body;
a spool located inside the valve body between the regulation valve and the solenoid valve, the spool comprising a first end, a second end, and a pass-through in the first end;
an undercut on an outer edge of the spool forming an opening between the spool and the valve body;
a third fluid port located in the valve body; and
a fluid pathway between the housing and the valve body,
wherein the spool moves axially along the axis of the valve body between a first position with the first end adjoining the regulation valve and a second position with the second end adjoining the solenoid valve;

wherein, when the spool is in the second position, the second fluid port fluidly communicates with the first end of the spool and with the regulation valve through the third fluid port and through the fluid pathway between the valve body and the housing;

wherein, when the spool is in the second position, the third fluid port is in fluid communication with the first fluid port through the second fluid port;

wherein, when the spool is in the second position, fluid flows from the second fluid port to the first end of the spool through the pass-through in the first end of the spool;

wherein, when the spool is in the first position, the first fluid port is in fluid communication with the second fluid port;

wherein the first fluid port is in fluid communication with the solenoid valve; and wherein, when the spool is in the second position, the spool is configured so that fluid flows from the first fluid port to the first end of the spool through the opening.

* * * * *